United States Patent [19]
LeFevre

[11] Patent Number: 5,622,293
[45] Date of Patent: Apr. 22, 1997

[54] WEARABLE LIQUID CONTAINER

[76] Inventor: Michael LeFevre, 1006 Anita, Grosse Pointe Woods, Mich. 48236

[21] Appl. No.: 429,542

[22] Filed: Apr. 27, 1995

Related U.S. Application Data

[63] Continuation-in-part of Ser. No. 234,161, Apr. 28, 1994, abandoned.

[51] Int. Cl.$^6$ .............................. A44C 25/00; B45F 3/20; B65D 35/08
[52] U.S. Cl. ...................... 224/148.2; 224/251; 224/602; 220/212; 63/4; 63/23
[58] Field of Search .............................. 220/212; 63/1.1, 63/3, 4, 21, 23; 224/148.1, 257, 258, 202, 148.2, 148.7, 148.3, 217, 219, 251, 904, 602; 403/388, 389, 391, 392; 285/238, 239, 259

[56] References Cited

U.S. PATENT DOCUMENTS

| D. 86,570 | 3/1932 | Humphreys . | |
|---|---|---|---|
| 164,119 | 4/1875 | Wills | 63/21 X |
| D. 196,534 | 10/1963 | Vanderhyde . | |
| D. 282,962 | 3/1986 | Gerber | 285/239 X |
| 655,025 | 7/1900 | Simon . | |
| 839,047 | 12/1906 | Sylvester . | |
| 1,650,764 | 11/1927 | Marin . | |
| 1,994,784 | 3/1935 | Porzel | 285/239 |
| 2,086,493 | 7/1937 | Ellingwood . | |
| 2,235,350 | 3/1941 | Anderson . | |
| 2,449,181 | 9/1948 | Smiley . | |
| 2,738,616 | 3/1956 | Windle . | |
| 2,771,768 | 11/1956 | Tudor . | |
| 3,129,020 | 4/1964 | Bujnowski | 285/238 X |
| 3,461,733 | 8/1969 | Peterson . | |
| 3,559,854 | 2/1971 | Loveland . | |
| 3,823,814 | 7/1974 | Lum . | |
| 4,058,237 | 11/1977 | Luke . | |
| 4,139,130 | 2/1979 | Glusker et al. . | |
| 4,176,772 | 12/1979 | Danon . | |
| 4,265,381 | 5/1981 | Muscatell . | |
| 4,502,298 | 3/1985 | Benton . | |
| 4,686,745 | 8/1987 | Butler . | |
| 4,768,688 | 9/1988 | Harrigan . | |
| 4,795,410 | 1/1989 | Alderfer . | |
| 5,323,554 | 6/1994 | MacDonald | 63/3 X |
| 5,482,076 | 1/1996 | Taylor et al. | 285/238 X |

FOREIGN PATENT DOCUMENTS

| 2624241 | 12/1977 | Germany | 285/239 |
|---|---|---|---|
| 204657 | 10/1923 | United Kingdom . | |
| 234663 | 6/1925 | United Kingdom | 224/219 |

OTHER PUBLICATIONS

Photograph of packaging from product known as Dazzle-Light made by Lexington & Associates, Inc. of Northridge CA.

Primary Examiner—Allan N. Shoap
Assistant Examiner—Niki M. Kopsidas

[57] ABSTRACT

A container for liquids formed of a flexible tubular member which has a pair of ends. The ends are connectable to form a loop. One of the ends has an opening to permit access to the liquid carried in the container.

21 Claims, 6 Drawing Sheets

WEARABLE LIQUID CONTAINER

CROSS-REFERENCE TO RELATED APPLICATION

This application is a continuation-in-part patent application of my patent application Ser. No. 08/234,161, entitled "Wearable Liquid Container", filed Apr. 28, 1994, now abandoned.

BACKGROUND OF THE INVENTION

I. Field of the Invention

A container for liquids, and more particularly, a container for liquids which is adapted to be worn about a person.

II. Description of the Prior Art

Containers for liquids such as cosmetics and suntan oil are well known in the art. Typically, these containers are in the form of a plastic bottle having a spout at a top. PCT Application No. WO88/05014 to Ludi discloses a clear, flexible container having a cap for transporting fluids. However, many liquids, such as suntan oil or lotions, are used frequently. It is desirable to have ready access to these products. It is also known to attach cords or strings to such containers. The loop of cord or string is placed over the neck of a person for transporting the container. However, such containers generally contain small quantities of liquid and are not reusable or refillable. Thus, it would be advantageous to have a container which is easily accessed by a user, is refillable, and carries a satisfactory quantity of fluid.

SUMMARY OF THE INVENTION

Accordingly, disclosed herein is a container for liquids formed of a flexible tubular member having an elongated cavity for holding liquid and a pair of ends which may be connected to form a loop. Alternatively, the tube may be wrapped around an arm or leg and the ends connected together. One end is adapted as a dispensing end with an outlet for permitting access to the liquid and refilling of the tube. A connecting member is mounted to this end. The other end has a tapered portion adapted to be received in the connecting member and dispensing end.

A first preferred embodiment of the container is also disclosed having a dispensing end having a neck with an outlet and a cap covering the outlet. The cap is removable to permit dispensing of the liquid contained inside the cavity of the tubular member. The cap may be dimensioned to join with the one end to form a loop which may be worn about the body of the person.

A second preferred embodiment includes a container having a seal member mounted in a receiving end of the tubular member to form a recess for receiving a cap which is threaded on an opposite end of the tubular member. The cap is frictionally received within the recess to hold the ends of the tube together. The cap may be removed from the tubular member for access to the liquid in the cavity.

A third preferred embodiment includes a tubular member having an open end and a sealed end. The sealed end is formed by heat welding and is tapered so that it may be inserted into the open end to join the two ends of the tubular member together to form a loop. Access to the liquid within the tube is thus provided.

A fourth preferred embodiment includes a connecting member having a pair of barbed barrel portions extending outwardly from a center stop portion. One barrel portion has long barbs which are tightly but removably engaged within one end of the tubular member. The other end has shorter barbs which are received within the dispensing end of the tubular member but permit easy removal of the connecting member to permit dispensing of the liquid in the container.

A fifth preferred embodiment includes a container having a radial wall extending within the tubular member to provide a pair of cavities for holding two different liquids. A connector formed of a pair of barbed connecting members and a second tubular member is used to join the ends of the tubular members together and provide access to both cavities.

Additionally disclosed is a carrying device for attaching a second tubular member, such as a tube of lip balm, to the container. The device includes an elastic sleeve which is seamed to form two axially extending cylindrical compartments. One compartment is formed to hold the lip balm and the second compartment is formed to hold the tubular member.

BRIEF DESCRIPTION OF THE DRAWINGS

The invention may be best understood by one skilled in the art by reference to the following description when considered in conjunction with the accompanying drawings in which.

DETAILED DESCRIPTION OF THE INVENTION

Figure 1:
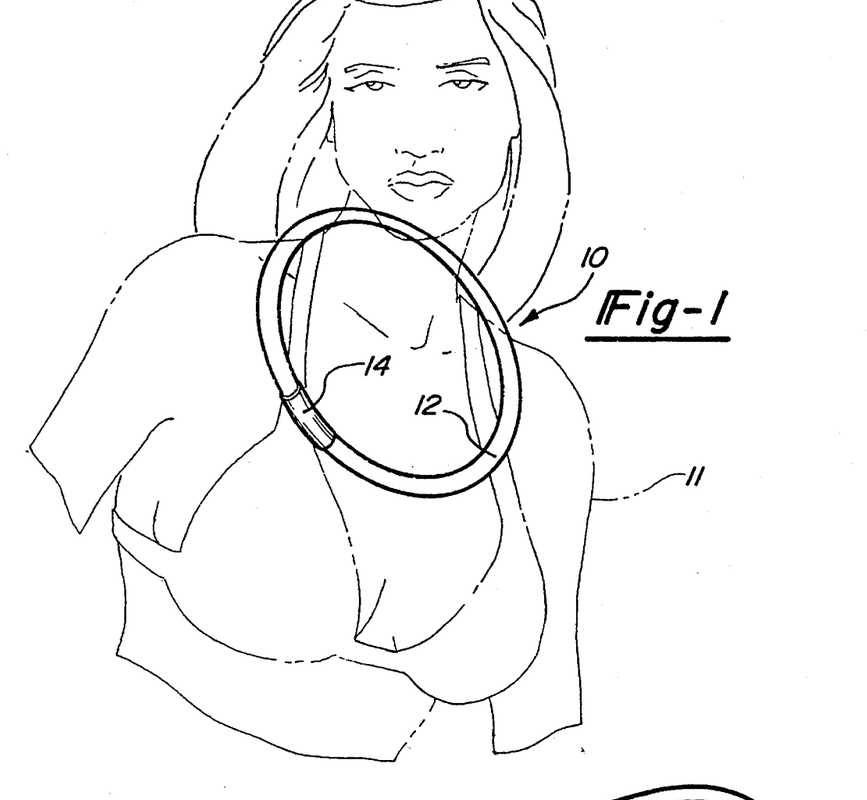
FIG. 1 is a perspective view of a container according to the invention in a connected position on a user.
Figure 2:
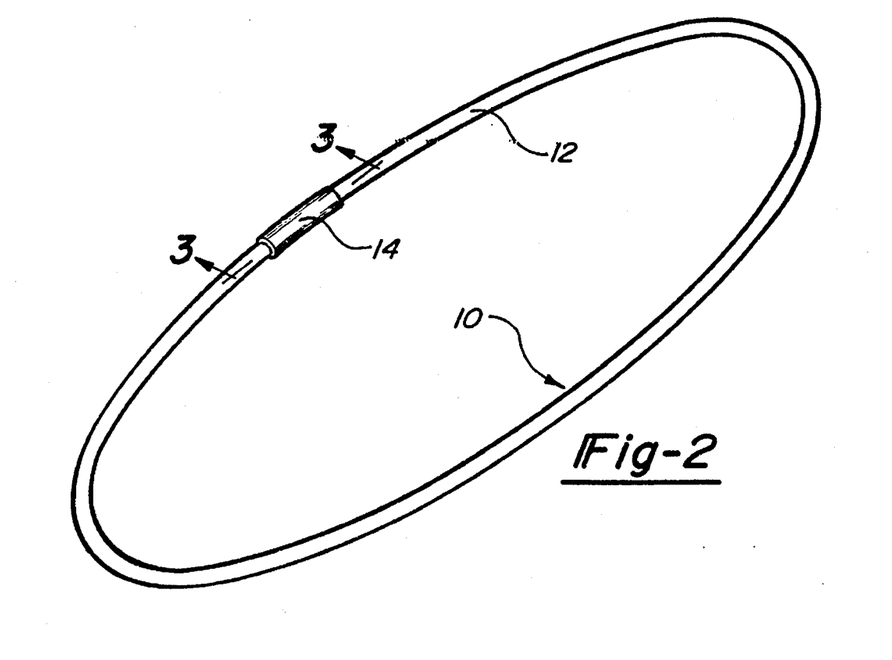
FIG. 2 is a perspective view of a preferred embodiment of the container in accordance with the invention.
Figures 3, 4, 5, 6:
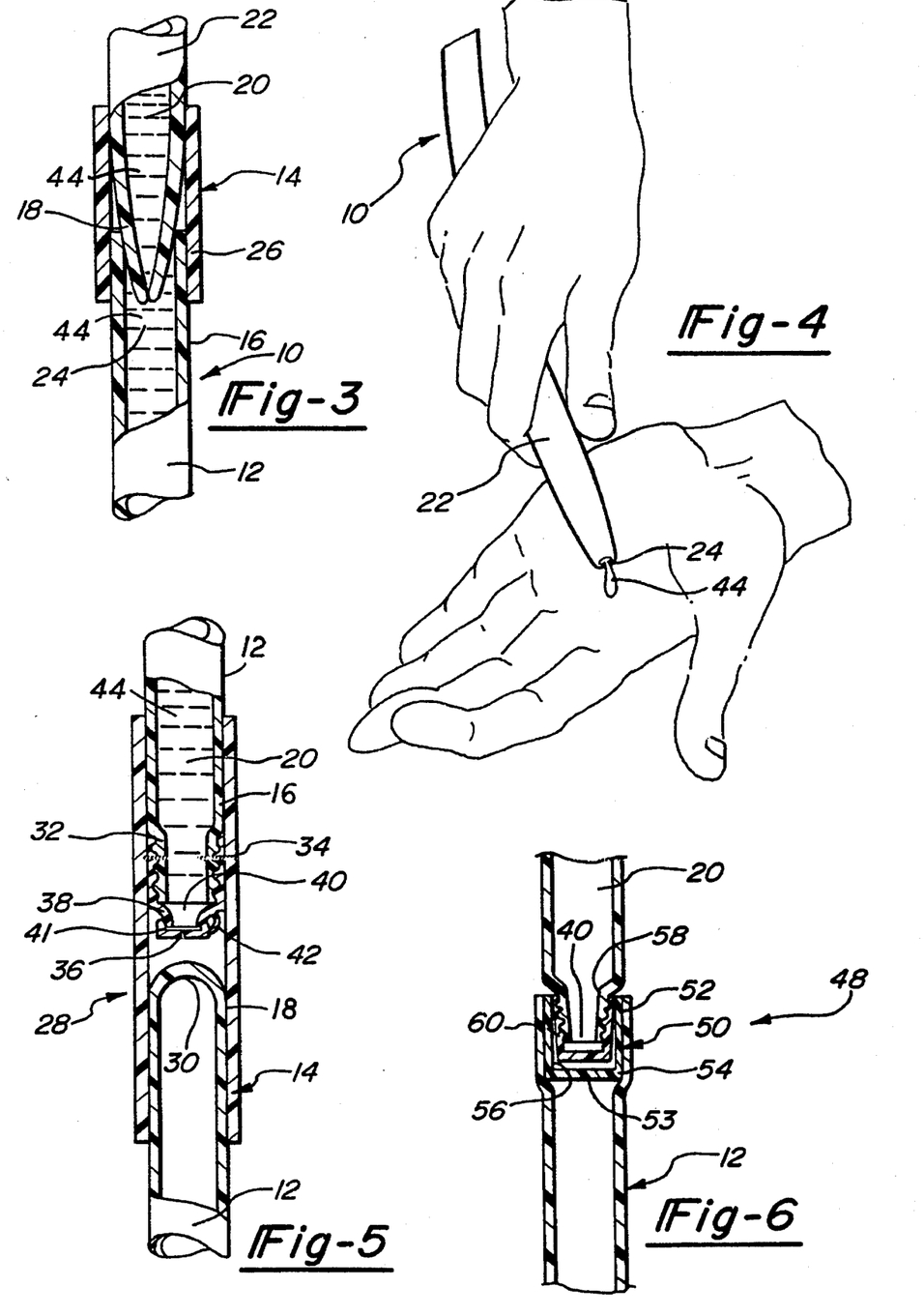
FIG. 3 is a cross-sectional view of a preferred embodiment of the container according to the invention.
FIG. 4 is a perspective view of a dispensing end of the container in accordance with the preferred embodiment of the invention showing a container in a dispensing position for access to a liquid.
FIG. 5 is a partial cross-sectional view of a first alternative preferred embodiment of a container in accordance with the invention.
FIG. 6 is a partial cross-sectional view of a second alternative preferred embodiment of a container in accordance with the invention.

Throughout the following detailed description, the same reference numerals refer to the same elements in all figures.

best shown in FIG. 1, a container 10 for use with liquids, particularly beverages, cosmetics, such as suntan oil and moisturizers, is shown in position on a user 11. As shown in FIGS. 2 and 3, the container 10 of the preferred embodiment includes an elongated tubular member 12 and a connecting member 14. The tubular member has a closed end 18 and a dispensing end 16. The closed end 18 is formed at an opposite end of the tubular member 12 for access to the liquid 44 which is contained in a cavity 20 formed within the tubular member 12.

The tubular member 12 may be formed of any suitable flexible material such as polyvinyl chloride. In the preferred embodiment the tube has an outer diameter of approximately ½ inch with an interior diameter of approximately ⅜ inch. The interior diameter defines the cavity 20 for containing liquids therein. The tubular member 12 is advantageously formed in 18", 24" or 36" lengths and the 24" length can hold approximately 3 oz. of liquid within. In the preferred embodiment, the tubular member 12 is formed of a clear transparent material, however, other materials may be incorporated into the tube to provide color or decorative appearance, such as a scrim. The tubular member 12 can also be brightly colored. The above sizes and dimensions are disclosed as examples only. Tubing of other dimensions may be used.

The closed end 18 has a tapered portion 22 which narrows from the normal outer diameter of the tubular member 12, for instance, ½ inch, to a diameter which is less than the inner diameter of the dispensing end 16 of the tube. The closed end 18 may be formed on the tubular member in a suitable manner, such as molding, or may be heat drawn with a die.

The connecting member 14 is in the form of a cylinder which has an inner diameter equal or slightly smaller than the outer diameter of the tubular member 12. One end 26 of the connecting member 14 is affixed to the dispensing or receiving end 16 of the tubular member 12 in a suitable fashion, such as glue heat welding. The connecting member 14 may be formed of a similar flexible material as the tubular member 12 and has sufficient length to engage the outer diameter of the tubular member 12 when the closed end 18 is inserted in the dispensing end 16 to form a loop. Thus, the tapered portion 22 is received within both the connecting member 14 and the dispensing or receiving end 16 of the tubular member 12 to connect the ends of the tubular member 12 as shown in FIGS. 1 and 2.

AS shown in FIG. 4, liquid contents 44 may be accessed through opening 24 of the dispensing end 16 when the closed end 18 is removed from the dispensing end 16. A first alternative preferred embodiment of a container 28 is shown in FIG. 5. The container 28 includes a tubular member 12 having an end wall 30 on the closed end 18. The connecting member 14 is mounted to the closed end 18 in the same fashion as discussed above for the dispensing end. A threaded portion 32 of the tubular member 12 is formed at an opposite end. A closure member 34 is threadably mounted to the threaded portion 32 of the tubular member 12. The closure member 34 is generally cylindrically shaped, having an axially extending neck 38. The closure member 34 has a diameter equal to the outer diameter of the tubular member 12 and has a diameter which is slightly larger than the inner diameter of the connecting member 14 in order to connect the ends of the tubular member together. The neck 38 has an opening 40 to permit access to the liquid 44 contained within the cavity 20 of the tube. A cap 36 is formed with a flange 41 which engages the neck 38 to sealingly close the opening 40. The cap 36 is held to the neck 38 by a hinge strip 42. When the cap 36 is removed, the fluid or contents 44 contained within the cavity 20 of the container may be dispensed. The closure member 34 may be unthreaded from the tubular member 12 to permit filling or refilling of the cavity with the liquid 44.

As best shown in FIG. 6, a second alternative preferred embodiment of a container 48 is thereshown. The second preferred embodiment includes a seal member 50 which is mounted in the receiving end of the tubular member 12. The seal member 50 has a flange 52 extending from a wall 53. The flange has an outer surface 54 and inner surface 56. The outer surface 54 engages the inner surface of the tubular member to close the tubular member. A threaded neck portion 58 having an axially disposed opening 40 is formed to accept a threaded cap 60. The cap 60 is removable to provide access to the cavity 20 and is dimensioned to be received snugly within the inner surface 56 of the seal member 50 to connect the ends of the tubular member together.

the container 10 may be advantageously used to carry liquids or powders and may be worn about the body of a person. The tube may be of any predetermined length, preferably large enough to encircle the head, neck (as shown in FIG. 1 ), or the waist of a user. The tubular container 10 may also be worn about the leg or arm by winding the tubular member 12 about the limb and then joining together the ends of the tubular member together, as discussed above.

Figure 7:
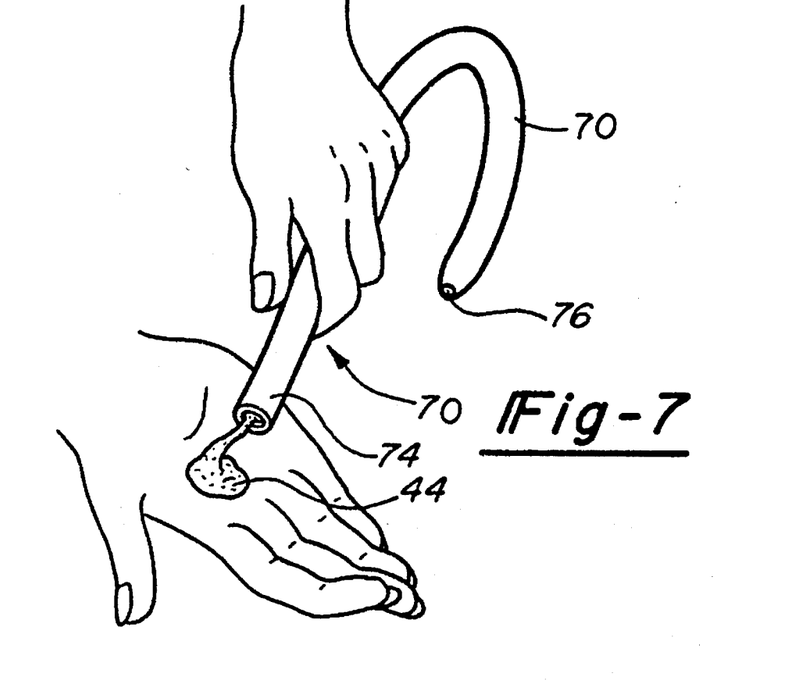
FIG. 7 is a perspective view of a third alternative preferred embodiment of a container in accordance with the invention.
Figure 8:
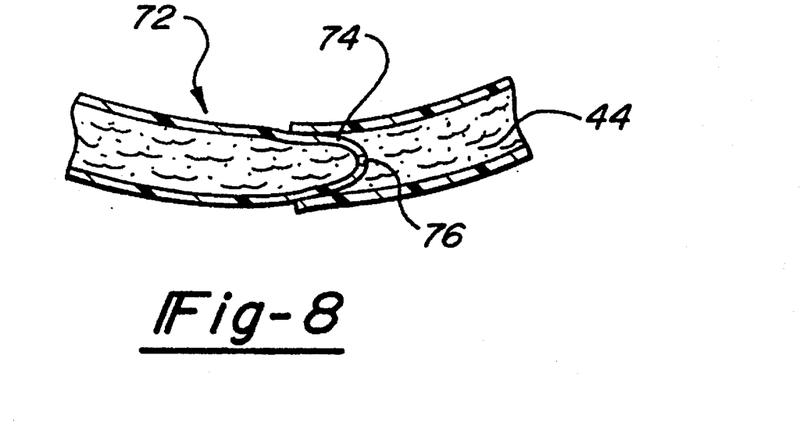
FIG. 8 is a partial cross-sectional view of a third alternative embodiment of a container in accordance with the invention.

As best shown in FIGS. 7 and 8, a third alternative preferred embodiment of a container 70 is thereshown. The third preferred embodiment includes a tubular member 72 having an open end 74 and a sealed end 76. The sealed end may be formed by molding or by heat welding the end of the tube to form a tapered end portion. The tapered end portion is then insertable into the open end to join the two ends together to form the loop as discussed above. When the ends are separated, access to the liquid 44 contained within the tube is provided.

Figures 9, 10A, 10B:
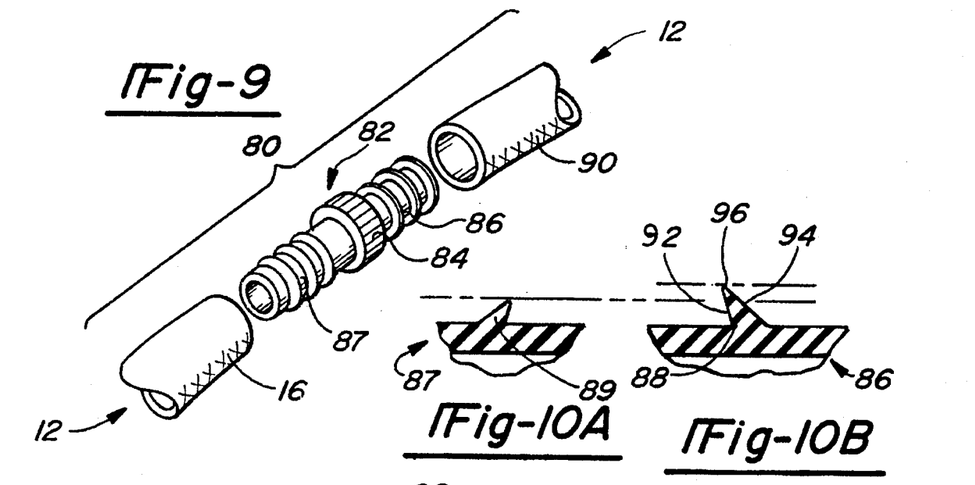
FIG. 9 is an exploded partial perspective view of a fourth alternative preferred embodiment of a container in accordance with the invention.
FIG. 10A is an enlarged view of a segment of one end of a connecting member of the fourth preferred embodiment of the container as shown in circle 10A of FIG. 10.
FIG. 10B is an enlarged view of a segment of another end of a connecting member of the fourth preferred embodiment of the container as shown in circle 10B of FIG. 10.
Figure 10:
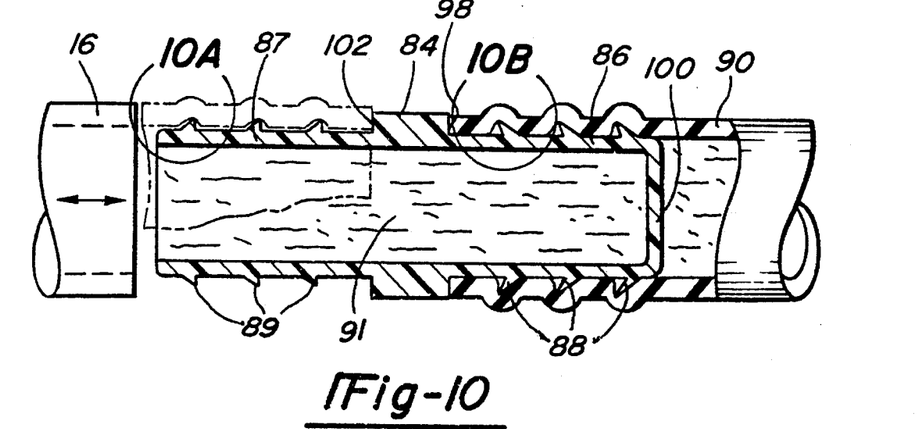
FIG. 10 is a partial sectional view of the fourth alternative preferred embodiment of the container in accordance with the invention.
Figure 11:
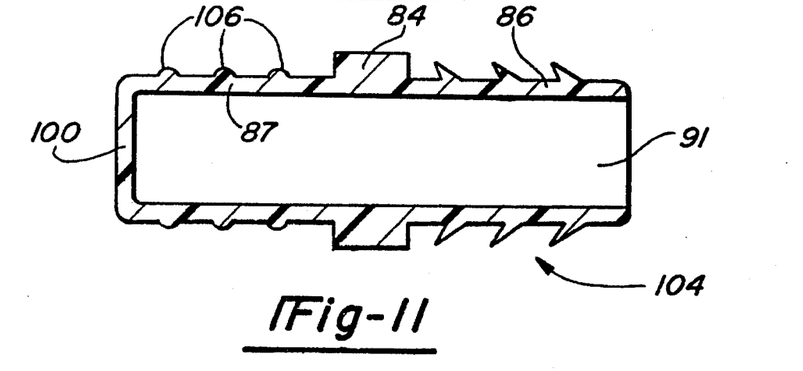
FIG. 11 is a cross-sectional view of an alternative connecting member of the fourth preferred embodiment of the container.

A fourth preferred embodiment of a container 80 in accordance with the invention is shown in FIGS. 9–11. As shown in FIG. 9, the container 80 includes the elongated tubular member or body 12 and a cylindrical connecting member 82. The tubular member 12 has a receiving end 90 and the dispensing end 16.

As shown in FIG. 10, the connecting member 82 has a cylindrical center portion 84 extending between a pair of barbed barrel end portions 86, 87. The connecting member 82 is molded of plastic and has an axial bore 91 extending through the connecting member to an end wall 100 of the barrel portion 86. One barrel portion 86 has three long barbs barbed elements or retaining elements 88 to tightly engage the inner wall of the receiving end 90 of the tubular member 12 and the other barrel portion 87 has three shorter barbs barbed elements or retaining elements 89 for sliding connection with the dispensing end 16 of the tubular member 12. The inner diameter of the barbs is generally equal to the inner diameter of the tubular member 12. The center portion 84 has an outer diameter generally the same as the outer diameter of the tubular member 12.

As best shown in FIG. 10B, the long barbs 88 have a triangular cross-section body with a short side 92 and a long side 94 converging at a pointed end 96. The long barbs 88 are thus angled inwardly towards the center portion 84 to facilitate insertion of the connecting member 82 into the receiving end 90. The connecting member 82 is pushed into the receiving end 90 of the tube until abutment with an annular surface 98 of the center portion 84. Although the connecting member 82 is formed to permit removal of the barrel portion 86 from the receiving end 90 of the tubular member 12, the angle and length of the barbs 88 act to prevent easy withdrawal from the tubular member 12. The connecting member may be removed to permit filling of the container 80 with liquid.

As shown in FIG. 10A, the other barrel portion 87 of the connecting member 82 has three short barbs 89 similar to the long barbs 88, but having a shorter radial length. The length is approximately ⅔ of the length of the long barbs 88. The barbs 89 angle inwardly toward annular surface 102 of the center portion 84. The length is selected so as to permit the barbs 89 to engage the inside of the dispensing end 16 of the tube 12 but permit easy removal from the receiving end 90 to permit dispensing of the liquid in the cavity 20 through the dispensing end 16.

As shown in FIG. 11, an alternative connecting member 104 has the radial wall 100 disposed at the end of the barrel portion 87. Rounded nodes 106 are used instead of the short barbs 89 disclosed above. The connecting members 82 and 104 are shown with an axial passage 91, however, the connecting members may be solid.

Figure 12:
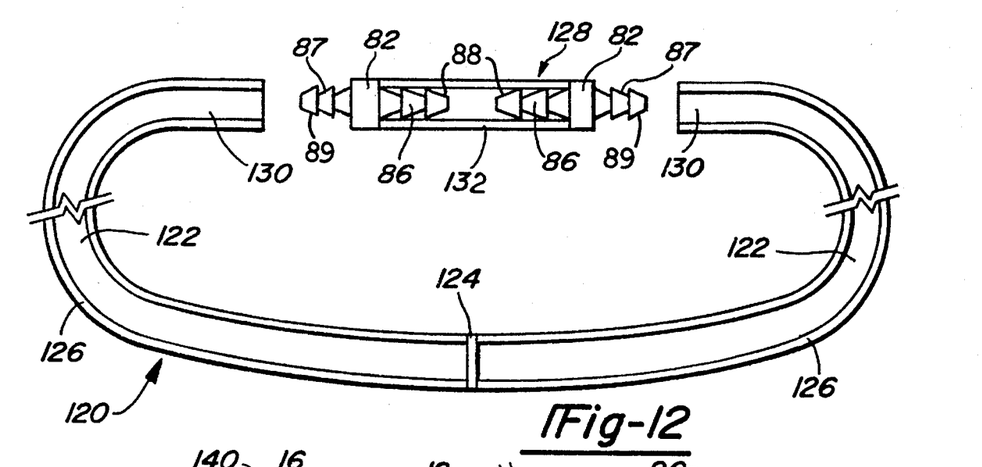
FIG. 12 is a perspective view of a fifth preferred embodiment of a container in accordance with the invention.

As shown in FIG. 12, a fifth preferred embodiment of the container includes a tubular member 120 having a pair of compartments 122 formed by a radially extending wall 124. The wall 124 can be formed by joining a disk of plastic between two tubes 126. The wall 124 may be electronically welded to the tubes 126. In this way, two different liquids, such as suntan oils having different SPF readings, can be carried in one container. A connector 128 is used to join ends 130 of the tubular member together. The connector 128 is formed of a short length of tubing 132 and two connecting members 82. The barrel portions 86 having the long barbs 88 are inserted into the respective ends of the short length of tubing 132. The barrel portions 87 having the short barbs 89 are then inserted into the open ends 130 of tubular member 120. Access into the compartments 122 may be had by removing the respective connecting member 82. Alternatively, a connecting member 82 having two barrel portions 87 each having short barbs 89 may be utilized to joining the ends 130 together.

Figure 13:
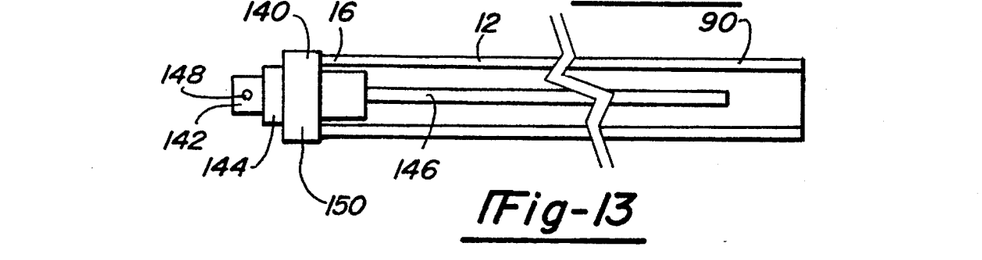
FIG. 13 is a partial perspective view of a sixth preferred embodiment of the container in accordance with the invention.

FIG. 13 shows a sixth preferred embodiment of the container according to the invention. Shown therein is a tubular member 12 having a spray nozzle 140 affixed to the dispensing end 16. The spray nozzle 140 is a commonly known type which has an outer cylinder 142 which is depressible into an inner cylinder 144 to form a vacuum for drawing liquid through a tube 146. The liquid is expelled through an aperture 148 in the outer cylinder 142. An inner cylinder 144 has an outer diameter equal to the inner diameter of the receiving end 90 of the tubular member 12 to facilitate joinder of the ends of the tube together for wearing as disclosed above. The spray nozzle 140 has a barrel 150 dimensioned to securely mount in the dispensing end 16 of the tubular member 12.

Figure 14:
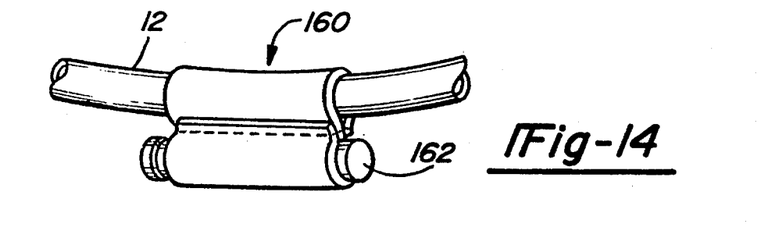
FIG. 14 is a perspective view of a carrying device in position for use on a container in accordance with the invention.
Figures 15, 16:
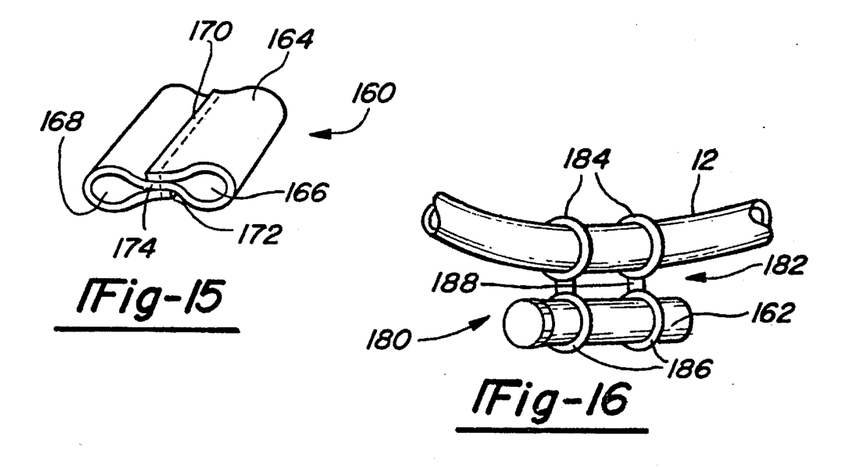
FIG. 15 is an end view of the carrying member in accordance with the invention.
FIG. 16 is a perspective view of an alternative carrying member in accordance With the invention.

Shown in FIGS. 14 and 15 is a carrying device 160 for connecting a cylindrical dispenser, such as a tube of lip balm 162 to the tubular member 12. The carrying device 160 is formed of an elastic strap 164 sewed together to provide two cylindrical passages 166, 168. The passages 166, 168 are formed to receive the tubular member 12 within. The passage 168 is formed to receive the lip balm 162. The elastic strap 164 may be of any conventional resilient material. In the preferred embodiment, the strap 164 has a width of approximately 1½ inches and extends approximately 2 inches. The strap 164 has two ends 170, 172 which are folded towards a center 174 and then stitched together to form the two passages 166, 168, as shown in FIG. 15.

An alternative carrying device 180 is shown in FIG. 16, where a pair of rigid supports 182 used to connect a cylindrical lip balm dispenser 162 to the tubular member 12. The supports 182 are molded of a suitable plastic material and each support 182 includes a ring 184 having an inner diameter formed to accept the tubular member 12 and a second ring 186 having an inner diameter formed to tightly accept the cylindrical dispenser 162. A center barb 188 connects the rings 184, 186 together. Like the carrying assembly shown above, the supports 182 are first slid over the tubular member 12 and spaced apart to permit insertion of the cylindrical dispenser 162 through the second rings 186.

Figure 17:
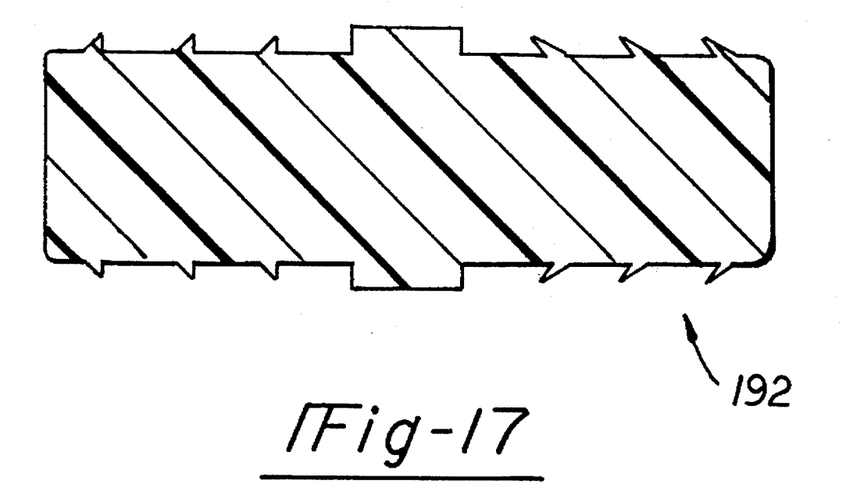
FIG. 17 is a cross-sectional view of an alternative solid connecting member.

A solid plastic connecting member 192 is shown in cross-section in FIG. 17. It has generally the same outside measurements as the hollow connecting member 82 of FIGS. 9 and 10.

Figure 18:
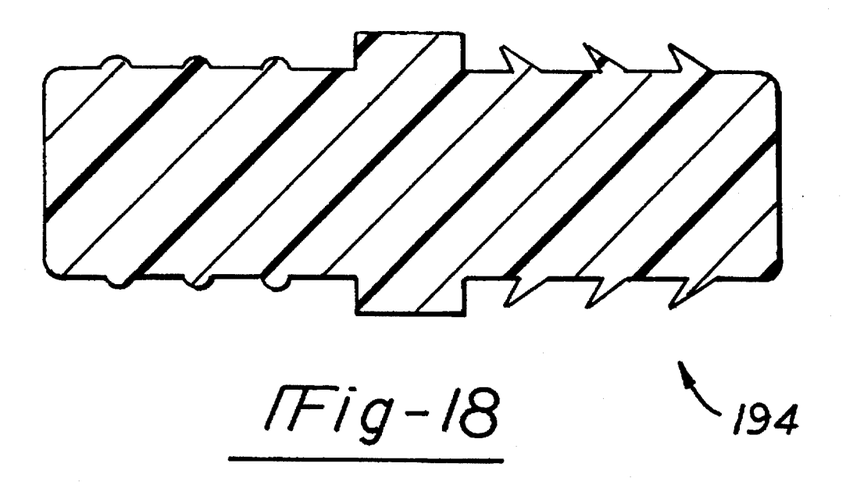
FIG. 18 is a cross-sectional view of still another alternative solid connecting member.

FIG. 18 shows another solid plastic connecting member 194 which has generally the same outside measurements as the hollow connecting member 104 of FIG. 11.

The above detailed description of the preferred embodiments is in no way limiting the scope and spirit of the invention. It is within the scope and spirit of the invention that other closures and connecting members could be used to open and permit access to the cavity and to close as well as to join the ends of the tubular member together.

I claim:

1. A liquid container in the form of a ring and adapted to be worn by a person using the container comprising:

an elongated tubular member made from a suitable flexible material, said tubular member having a pair of end portions terminating in a pair of opposite facing annular end surfaces;

said tubular member being hollow throughout its length to form a single chamber for receiving a liquid;

one of said end portions of said tubular member forming a dispensing end through which the liquid is dispensed and the other of said end portions forming a receiving end;

a connecting member for connecting the dispensing and receiving ends of said tubular member, said connecting member comprising an elongated cylindrical body having a cylindrical center portion located between a pair of barbed barrel end portions;

said cylindrical center portion having an outer diameter generally equal to the outer diameter of said tubular member and also having a pair of annular surfaces which abut the annular end surfaces of said tubular member when said members are assembled to form a ring;

a plurality of individual barbed elements circumferentially disposed on each of said barrel end portions, said barbed elements being separate and axially spaced-apart on their respective said barrel end portions and having respective maximum outer transverse dimensions greater than respective inner diameters of said tubular end portions;

the barbed elements on one of said barrel end portions being longer than the barbed elements on the other of said barrel end portions, with the longer of said barbed elements being inserted into said receiving end of said tubular end portion until one of the annular surfaces on said cylindrical center portion abuts the opposing end surface on said receiving end and with the longer barbed elements tightly engaging the inner wall of said receiving end; and the shorter barbed elements on the other barrel end portion being inserted into the dispensing end of said tubular member until the other of said annular surfaces on said cylindrical center portion abuts the end surface on said dispensing end of said tubular member to form a sliding connection between said shorter barbed elements and the inner wall of the dispensing end.

2. The liquid container as defined in claim 1, wherein said longer barbed elements each has a body with a triangular cross section, said body having a short side and a long side converging at a pointed end.

3. The liquid container as defined in claim 2, wherein said longer barbed elements are angled inwardly towards said cylindrical center portion to facilitate insertion of said connecting member into the receiving end of said tubular member.

4. The liquid container as defined in claim 1, wherein said shorter barbed elements each has a body with a triangular cross section, said body having a short side and a long side converging at a pointed end.

5. The liquid container as defined in claim 4, wherein said shorter barbed elements are angled inwardly towards said cylindrical center portion.

6. The liquid container as defined in claim 4, wherein the length of each of said shorter barbed elements is approximately two thirds of the length of each longer barbed element to permit said shorter barbed elements to engage the inside wall of the dispensing end of the tubular member to provide easy removal of said connecting member from the dispensing end and thereby permit dispensing of the liquid through the dispensing end of the tubular member.

7. The liquid container as defined in claim 1, wherein the connecting member is solid.

8. The liquid container as defined in claim 1, wherein said connecting member is hollow, being opened at one end and closed at the other end thereof.

9. The liquid container as defined in claim 1, wherein the flexible material of said tubular member is a clear transparent material.

10. The liquid container as defined in claim 1, wherein the flexible material of said tubular member is polyvinyl chloride.

11. The liquid container as defined in claim 1, wherein said connecting member is made from a plastic material.

12. The liquid container as defined in claim 1, wherein a carrying device is attached to said tubular member, said device being made from a material having a body provided with a pair of generally parallel cylindrical passages, said tubular member extending through one of said cylindrical passages and the other of said cylindrical passages being adapted to carry an object.

13. A liquid container in the form of a ring and adapted to be worn by a person using the container comprising:

an elongated tubular member made from a suitable flexible material, said tubular member having a pair of end portions terminating in a pair of opposite facing annular end surfaces;

said tubular member being hollow throughout its length to form a single chamber for receiving a liquid;

one of said end portions of said tubular member forming a dispensing end through which the liquid is dispensed and the other of said end portions forming a receiving end;

a connecting member for connecting the dispensing and receiving ends of said tubular member, said connecting member comprising an elongated cylindrical body having a cylindrical center portion located between a pair of barrel end portions;

said cylindrical center portion having an outer diameter generally equal to the outer diameter of said tubular member and also having a pair of annular surfaces which abut the annular end surfaces of said tubular member when said members are assembled to form a ring;

a plurality of individual retaining elements circumferentially disposed on each of said barrel end portions, said retaining elements being separate and axially spaced-apart on their respective said barrel end portions and having respective maximum outer transverse dimensions greater than respective inner diameters of said tubular end portions;

the retaining elements of said barrel end portions being inserted into the receiving and dispensing ends of said tubular member to engage the inner walls thereof until the annular surfaces of said cylindrical center portion abut the opposing annular end surfaces of said receiving and dispensing ends;

said retaining elements received in the receiving end of said tubular member are longer than the retaining elements received in the dispensing end of the tubular member which form a sliding connection between said shorter retaining elements and the inner wall of said dispensing end.

14. The liquid container as defined in claim 13, wherein a carrying device is attached to said tubular member, said device being made from an elastic material having a body provided with a pair of generally parallel cylindrical passages, said tubular member extending through one of said cylindrical passages and the other of said cylindrical passages being adapted to carry an object.

15. The liquid container as defined in claim 13, wherein said connecting member is solid and is made from a plastic material.

16. A liquid container in the form of a ring and adapted to be worn by a person using the container comprising:

an elongated tubular member made from a suitable flexible material, said tubular member having a pair of end portions terminating in a pair of opposite facing annular end surfaces;

said tubular member being hollow throughout its length to form a single chamber for receiving a liquid;

one of said end portions of said tubular member forming a dispensing end through which the liquid is dispensed and the other of said end portions forming a receiving end;

a connecting member for connecting the dispensing and receiving ends of said tubular member, said connecting member comprising an elongated cylindrical body having a cylindrical center portion located between a pair of barrel end portions;

said cylindrical center portion having an outer diameter generally equal to the outer diameter of said tubular member and also having a pair of annular surfaces which abut the annular end surfaces of said tubular member when said members are assembled to form a ring;

a plurality of individual retaining elements circumferentially disposed on each of said barrel end portions, said retaining elements being separate and axially spaced-apart on their respective said barrel end portions and having respective maximum outer transverse dimensions greater than respective inner diameters of said tubular end portions;

the retaining elements of said barrel end portions being inserted into the receiving and dispensing ends of said tubular member to engage the inner walls thereof until the annular surfaces of said cylindrical center portion abut the opposing annular end surfaces of said receiving and dispensing ends;

said retaining elements on the barrel end portion which are inserted into said dispensing end of said tubular member are in the form of rounded nodes; and the retaining elements on the other of said barrel end portions are in the form of barbed elements, each barb element having a body with a triangular cross-section, said body having a short side and a long side converging at a pointed end.

17. The liquid container as defined in claim 16, wherein said barbed elements are angled inwardly towards said cylindrical center portion to facilitate insertion of said connecting member into the receiving end of said tubular member.

18. A liquid container in the form of a ring and adapted to be worn by a person using the container comprising:

an elongated tubular member made from a suitable flexible material, said tubular member having a pair of end portions terminating in a pair of opposite facing annular end surfaces;

said tubular member being hollow throughout its length to form a single chamber for receiving a liquid;

one of said end portions of said tubular member forming a dispensing end through which the liquid is dispensed and the other of said end portions forming a receiving end;

a connecting member for connecting the dispensing and receiving ends of said tubular member, said connecting member comprising an elongated cylindrical body having a cylindrical center portion located between a pair of barrel end portions;

said cylindrical center portion having an outer diameter generally equal to the outer diameter of said tubular member and also having a pair of annular surfaces which abut the annular end surfaces of said tubular member when said members are assembled to form a ring;

a plurality of individual retaining elements circumferentially disposed on each of said barrel end portions, said retaining elements being separate and axially spaced-apart on their respective said barrel end portions and having respective maximum outer transverse dimensions greater than respective inner diameters of said tubular end portions;

the retaining elements of said barrel end portions being inserted into the receiving and dispensing ends of said tubular member to engage the inner walls thereof until the annular surfaces of said cylindrical center portion abut the opposing annular end surfaces of said receiving and dispensing ends; and a carrying device is attached to said tubular member, said device being in the form of a pair of spaced apart double ring structures, each structure having two rings, with said tubular member extending through a pair of rings in the spaced apart structures, and the other pair of rings in the spaced apart structures being adapted to carry an object.

19. The liquid container as defined in claim 18, wherein said tubular member and said connecting member are made from a plastic material.

20. The liquid container as defined in claim 18, wherein said tubular member and said connecting member are made from polyvinyl chloride.

21. The liquid container as defined in claim 20, wherein the cylindrical body of said connecting member is solid.

* * * * *